United States Patent
Nagaya

(10) Patent No.: US 12,539,465 B2
(45) Date of Patent: Feb. 3, 2026

(54) CONTENT-VIDEO PLAYBACK PROGRAM, CONTENT-VIDEO PLAYBACK DEVICE, CONTENT-VIDEO PLAYBACK METHOD, CONTENT-VIDEO-DATA GENERATION PROGRAM, AND CONTENT-VIDEO-DATA GENERATION DEVICE

(71) Applicant: CYGAMES, INC., Tokyo (JP)

(72) Inventor: Masumi Nagaya, Tokyo (JP)

(73) Assignee: CYGAMES, INC.

( * ) Notice: Subject to any disclaimer, the term of this patent is extended or adjusted under 35 U.S.C. 154(b) by 262 days.

(21) Appl. No.: 18/460,015

(22) Filed: Sep. 1, 2023

(65) Prior Publication Data

US 2024/0031654 A1    Jan. 25, 2024

Related U.S. Application Data

(63) Continuation of application No. PCT/JP2022/008718, filed on Mar. 2, 2022.

(30) Foreign Application Priority Data

Mar. 4, 2021    (JP) ................. 2021-034293

(51) Int. Cl.
*H04N 21/472* (2011.01)
*A63F 13/60* (2014.01)
(Continued)

(52) U.S. Cl.
CPC ............ *A63F 13/60* (2014.09); *G06T 3/4038* (2013.01); *G06T 5/70* (2024.01); *G06T 7/11* (2017.01);
(Continued)

(58) Field of Classification Search
CPC ... A63F 13/60; G06T 7/11; G06T 7/20; G06T 5/70; G06T 3/4038; G06T 2207/20132; H04N 19/503; H04N 21/47217
See application file for complete search history.

(56) References Cited

U.S. PATENT DOCUMENTS

2010/0002767 A1    1/2010 Fujibayashi et al.

FOREIGN PATENT DOCUMENTS

| | | |
|---|---|---|
| JP | S62-213496 A | 9/1987 |
| JP | H03-29477 A | 2/1991 |

(Continued)

OTHER PUBLICATIONS

International Search Report issued in corresponding International Application No. PCT/JP2022/008718, mailed on Apr. 12, 2022 (6 pages).

(Continued)

*Primary Examiner* — Lawrence S Galka
(74) *Attorney, Agent, or Firm* — Osha Bergman Watanabe & Burton LLP

(57) ABSTRACT

In order to provide a content-video playback program, a content-video playback device, a content-video playback method, a content-video-data generation program, and a content-video-data generation device that are capable of playing back a high-quality video of aerosols in the atmosphere, such as cloud, fog, haze, steam, and gas, with less computer resources, a video playback processing unit that plays back a compressed video data generates video data, with high reproducibility, through only simple calculation processing in which items of grid-cell image data are moved by grid vectors, and brightness interpolation calculation processing is performed.

8 Claims, 10 Drawing Sheets

(51) Int. Cl.
*G06T 3/40* (2024.01)
*G06T 3/4038* (2024.01)
*G06T 5/00* (2024.01)
*G06T 5/70* (2024.01)
*G06T 7/11* (2017.01)
*G06T 7/20* (2017.01)

(52) U.S. Cl.
CPC ...... *G06T 7/20* (2013.01); *G06T 2207/20132* (2013.01)

(56) References Cited

FOREIGN PATENT DOCUMENTS

| | | | |
|---|---|---|---|
| JP | 2002-074369 | A | 3/2002 |
| JP | 2004-179906 | A | 6/2004 |
| JP | 2006-129326 | A | 5/2006 |
| JP | 2006-180426 | A | 7/2006 |
| JP | 6196597 | B2 | 9/2017 |
| JP | 2020-005202 | A | 1/2020 |
| WO | 2008-078782 | A1 | 7/2008 |

OTHER PUBLICATIONS

Written Opinion issued in corresponding International Application No. PCT/JP2022/008718, mailed on Apr. 12, 2022 (3 pages).

J. Blinn; "Light Reflection Functions for Simulation of Clouds and Dusty Surfaces"; Computer Graphics, vol. 16 No. 3, pp. 21-29; Jul. 1982 (9 pages).

J. Kajiya et al.; "Ray Tracing Volume Densities"; Computer Graphics, vol. 18 No. 3, pp. 165-174; Jul. 1984; Retrieved from Internet on Jun. 7, 2014; Retrieved from Internet: URL: https://www.researchgate.net/profile/Brian_Von_Herzen3/publication/242588930_Ray_tracing_volume_densities_computer_graphics_18/links/00b7d53931e71dfc04000000/Raytracing-volume-densities-computer-graphics-18.pdf (11 pages).

T. Nishita et al; "Display of Clouds Taking into Account Multiple Anisotropic Scattering and Sky Light"; Siggraph, pp. 379-386; 1996 (13 pages).

Extraordinary attention to the expression of "clouds" in "Granblue Fantasy Project Re:Link" [GCC'17], famitsu.COM, Kadokawa Game Linkage Inc.; Retrieved from Internet on Aug. 16, 2014; Retrieved from Internet: URL: https://www.famitsu.com/news/201703/22129373.html (JP title); Project Re:Link; [GCC'17];Kadokawa Game Linkage (16 pages).

CONTENT-VIDEO PLAYBACK PROGRAM, CONTENT-VIDEO PLAYBACK DEVICE, CONTENT-VIDEO PLAYBACK METHOD, CONTENT-VIDEO-DATA GENERATION PROGRAM, AND CONTENT-VIDEO-DATA GENERATION DEVICE

TECHNICAL FIELD

The present invention relates to a content-video playback program, a content-video playback device, a content-video playback method, a content-video-data generation program, and a content-video-data generation device that are suitable for a video of aerosols in the atmosphere, in particular, cloud, fog, haze, steam, and gas.

BACKGROUND ART

The applicant develops and distributes game programs and game services. Many game service providers, including the applicant, provide online game services in which personal computers or smartphones connect to game servers, which provide game content via the Internet, and receive various items of game content through those game servers.

One aspect of games provided by such game service providers is a content playback service having a complex content playback function obtained by integrating not only an action game element, in which a game character (hereinafter, simply abbreviated to "character") is moved according to an operation by a user, but also functional elements such as a novel game, in which a story progresses when characters make a conversation, an animation video, and a web browser. Then, in some items of game content, an imaginary world is expressed as a character's active space.

In some game services provided by the applicant, flowing clouds are expressed with an animation video, as one means for expressing the imaginary world.

The inventors thought that it is extremely important to draw, in high quality, clouds that are full of reality and that have a presence, as a means for expressing an imaginary world in game content. Even when a beautifully drawn character is prepared, when the background is the quality of a punch picture or graffito, it is impossible to appeal to a game player for game world view. It is only when a beautiful background is prepared for a beautiful character that the world view is recognized by the game player, whereby the game player can be immersed in the world of the game.

The technique of beautifully drawing flowing clouds has a long history.

For rendering of clouds, it is necessary to calculate scattering of sun light in the clouds. Researches into this scattered-light rendering have been continued since 1980's. For example, basic algorithms have been developed, such as first-order scattering approximation (Non-Patent Literature 1), volume rendering in which multiple scattering is taken into consideration (Non-Patent Literature 2), and a global illumination model for clouds (Non-Patent Literature 3). In 1990's, the basic algorithms are applied to real-time rendering using GPU (Graphics Processing Unit). In 2010's, with OpenVDB (https://www.openvdb.org) developed by DreamWorks Animation or other technologies, a method of performing real-time rendering by treating cloud as volume data is established. However, since rendering of volume data is high load, a method of performing high-efficient and high-quality rendering on clouds in a wide landscape, which is required for the game service provided by the applicant, has not yet been established (Non-Patent Literature 4).

Patent Literature 1 discloses a technique of calculating, from two images that are included in a video and that are different in time, velocity vectors corresponding to individual pixels in the images and finding a velocity field vector obtained by coordinate-arraying the velocity vectors.

Patent Literature 2 discloses a technique of estimating model parameters of a moving object. It is assumed that the model parameters are estimated by the objective function of a mathematical model that is related to waves expressing the characteristics of a wave phenomenon including continuous and discontinuous motions and that integrates a wave generation equation expressing a time-series change in image brightness and an optical flow model serving as a motion estimation model in image processing, and the objective function includes a constraint condition with a wave dispersion relational expression.

CITATION LIST

Patent Literature

[Patent Literature 1] Japanese Unexamined Patent Application, Publication No. 2002-074369
[Patent Literature 2] Publication of Japanese Patent No. 6196597

Non-Patent Literature

[Non-Patent Literature 1] Blinn, J.: Light Reflection Functions for Simulation of Clouds and Dusty Surfaces, SIGGRAPH 1982, pp. 21-29 (1982), Internet <https://ohiostate.pressbooks.pub/app/uploads/sites/45/201710/blinn-dusty.pdf>
[Non-Patent Literature 2] Kajiya, J. and Von Herzen, B.: Ray Tracing Volume Densities, SIGGRAPH 1984, pp. 165-174 (1984), Internet <https://www.researchgate.net/profile/Brian_Von_Herzen3/public ation/242588930_Ray_tracing_volume_densities_computer_graphics_18/links/00b7d53931e71dfc04000000/Ray-tracing-volume-densities-computer-graphics-18.pdf>
[Non-Patent Literature 3] Nishita, T., Dobashi, Y. and Nakamae, E.: Display of Clouds Taking into Account Multiple Anisotropic Scattering and Sky Light, SIGGRAPH 1996, pp. 379-386 (1996).
[Non-Patent Literature 4] An extraordinary uncompromising approach of [GRANBLUE FANTASY Project Re:LINK] to "cloud" expression [GCC'17], famitsu.COM, Kabushiki Gaisha KADOKAWA Game Linkage, Internet <https://www.famitsu.com/news/201703/22129373.html>

SUMMARY OF INVENTION

Technical Problem

In particular, from the point of view of a computer, a smartphone has limited resources (resources, computer resources), such as the computing power of a CPU and a GPU, the storage capacity of a memory and a storage, etc. Since recent items of game content tend to consume lots of computer resources, computer resources available for drawing of clouds, i.e., background, are limited. The inventors thought that they want to play back a high-quality cloud video with as little computer resources as possible.

The present invention has been made in view of the above-described problem, and an object thereof is to provide a content-video playback program, a content-video playback device, a content-video playback method, a content-video-data generation program, and a content-video-data generation device that are capable of playing back a high-quality video of aerosols in the atmosphere, such as cloud, fog, haze, steam, and gas, with less computer resources.

Solution to Problem

In order to solve the above-described problem, the present invention provides a content-video playback program causing a computer to realize functions of a content-video playback device that is composed of: a video playback processing unit that extracts a compressed video from a compressed video file to output video data; a main-game-content generation processing unit that reads various kinds of game data from a game data group to generate various videos through an operation using an operation unit; and an image composition processing unit that composes video data generated at the main-game-content generation processing unit and the video data generated at the video playback processing unit and that outputs the resultant to a display unit.

The content-video playback program according to the present invention is a program for realizing the following functions shown in (a) and (b):

(a) a content-data extraction processing function of excerpting, from the compressed video file, and extracting, by means of a data extraction processing unit, current-frame image data that is image data at a base point in time, next-frame image data that is image data at a point in time after a predetermined time has elapsed from the base point in time, and a grid vector group that is a collection of grid lists listing grid vectors indicating the amounts of movement and the directions of movement of items of grid-cell image data into which the current-frame image data is subdivided, toward coordinate directions in a screen at the point in time of the next-frame image data; and (b) an interpolation calculation processing function of performing, by means of an interpolation calculation processing unit, frame interpolation calculation for frames between the current-frame image data and the next-frame image data on the basis of the current-frame image data, the next-frame image data, the grid vector group, and the grid lists and outputting video data.

Advantageous Effects of Invention

According to the present invention, it is possible to provide a content-video playback program, a content-video playback device, a content-video playback method, a content-video-data generation program, and a content-video-data generation device that are capable of playing back high-quality video of aerosols in the atmosphere, such as cloud, fog, haze, steam, and gas, with less computer resources.

Problems, configurations, and advantageous effects other than those described above will be apparent from the following description of an embodiment.

DESCRIPTION OF EMBODIMENTS

[Content Playback Device 101]

Figure 1:
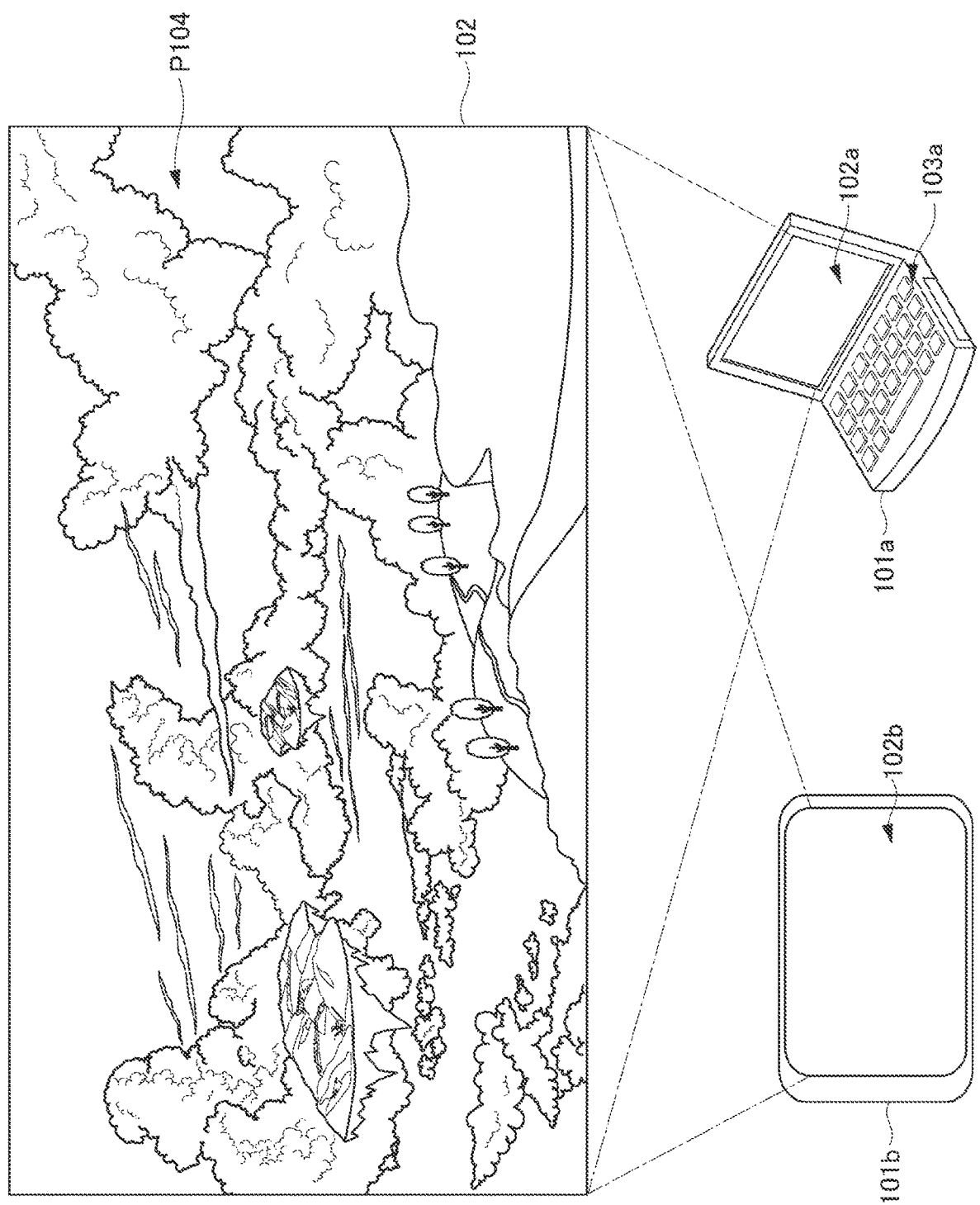
FIG. 1 is a schematic view showing content playback devices according to an embodiment of the present invention and display screens thereof.

FIG. 1 is a schematic view showing a content playback device 101a and a content playback device 101b according to an embodiment of the present invention.

In FIG. 1, the content playback device 101a is a well-known personal computer, and the content playback device 101b is a well-known smartphone.

The personal computer reads a game program to function as the content playback device 101a. The content playback device 101a has a display unit 102a, such as an LCD display, and a keyboard 103a. A user thereof operates the keyboard 103a and a pointing device, such as a mouse, of the content playback device 101a to enjoy a game.

The smartphone reads a game program to function as the content playback device 101b. A user thereof operates a touchscreen display 102b of the content playback device 101b to enjoy a game.

Although CPUs built in the content playback device 101a and the content playback device 101b have different specifications, the content playback device 101a and the content playback device 101b can playback the same game content. Note that, hereinafter, in the case where there is no need to distinguish between the content playback device 101a and the content playback device 101b, they are each referred to as a content playback device 101. Furthermore, in the case where there is no need to distinguish between the display unit 102a of the content playback device 101a and the touchscreen display 102b of the content playback device 101b as display functions, they are each referred to as a display unit 102.

In the game content played when the content playback device 101 executes the game program, a flowing-cloud video P104 is played on the display unit 102. By playing this cloud video, an imaginary world in the game content can be effectively expressed. For example, an example of the game content can be GRANBLUE FANTASY (registered trademark) of which the service is provided by the applicant.

Figure 2:
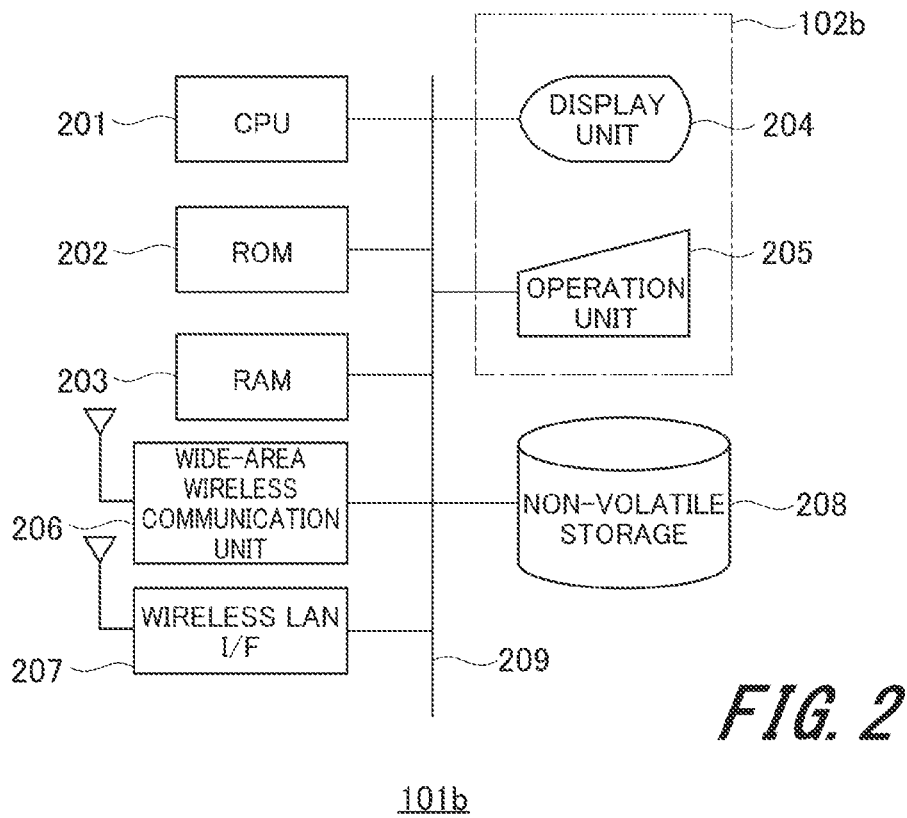
FIG. 2 is a block diagram showing the hardware configuration of one of the content playback devices.

FIG. 2 is a block diagram showing the hardware configuration of the content playback device 101b. The content playback device 101b, which is a well-known computer, includes a CPU 201, a ROM 202, a RAM 203, a display unit 204, an operation unit 205, a wide-area wireless communication unit 206, a wireless LAN interface 207, and a non-volatile storage 208 that are connected to a bus 209.

Since the content playback device 101b is a smartphone, the operation unit 205 is an electrostatic touch screen, and the display unit 204 and the operation unit 205 form the touchscreen display 102b.

A game program causing a computer to operate as the content playback device 101 is stored in the non-volatile storage 208.

In the case where the content playback device 101 is the content playback device 101a, which is formed of a personal computer, the operation unit 205 is formed of the keyboard 103a, a mouse, etc. Although the content playback device 101a does not require the wide-area wireless communication unit 206, an NIC (Network Interface Card) (not shown) is connected to the bus 209 instead.

As described above, in the content playback device 101a and the content playback device 101b, main information processing functions are not much different, except for differences in details. Thus, the content playback device 101a and the content playback device 101b can equally execute software functions to be described by using FIG. 3 and the following figures.

Figure 3:
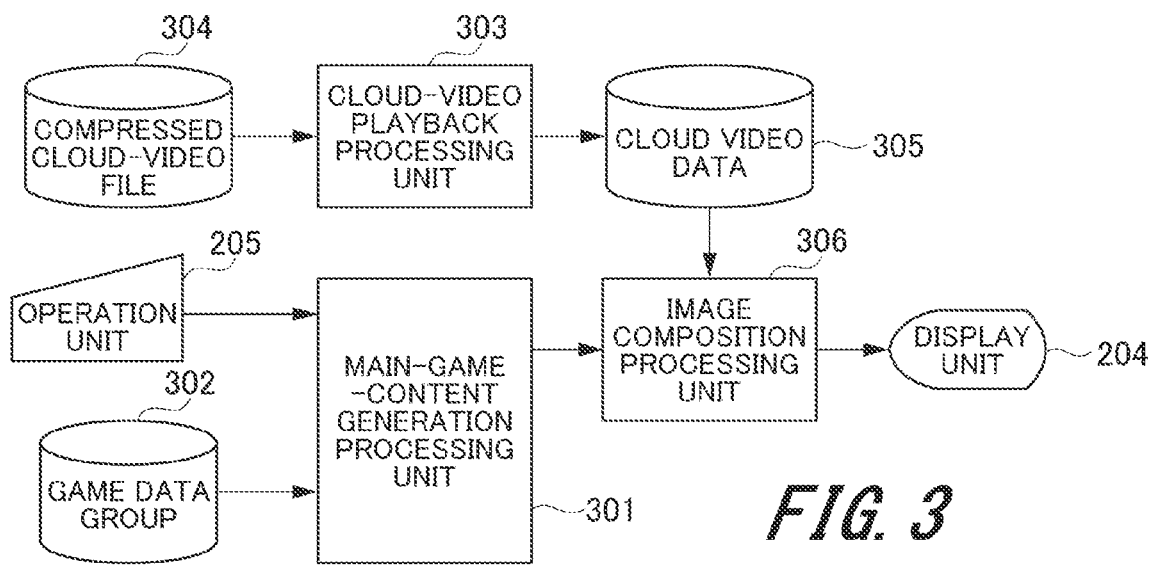
FIG. 3 is a block diagram showing software functions of each of the content playback devices.

FIG. 3 is a block diagram showing software functions of the content playback device 101.

A main-game-content generation processing unit 301 is a game engine body. The main-game-content generation processing unit 301 reads a game data group 302 and generates various videos and still images in response to operations on the operation unit 205.

A cloud-video playback processing unit 303 that is a video playback processing unit has a cloud-video generation function according to the present invention, reads a compressed cloud-video file 304 that is compressed video data, and generates cloud video data 305.

An image composition processing unit 306 composes video data generated by the main-game-content generation processing unit 301 and the cloud video data 305 generated by the cloud-video playback processing unit 303, and outputs the resultant to the display unit 204.

Here, the cloud video data is merely described as one example of the embodiment, and the present invention is not limited to playback of cloud video data.

Figure 4:
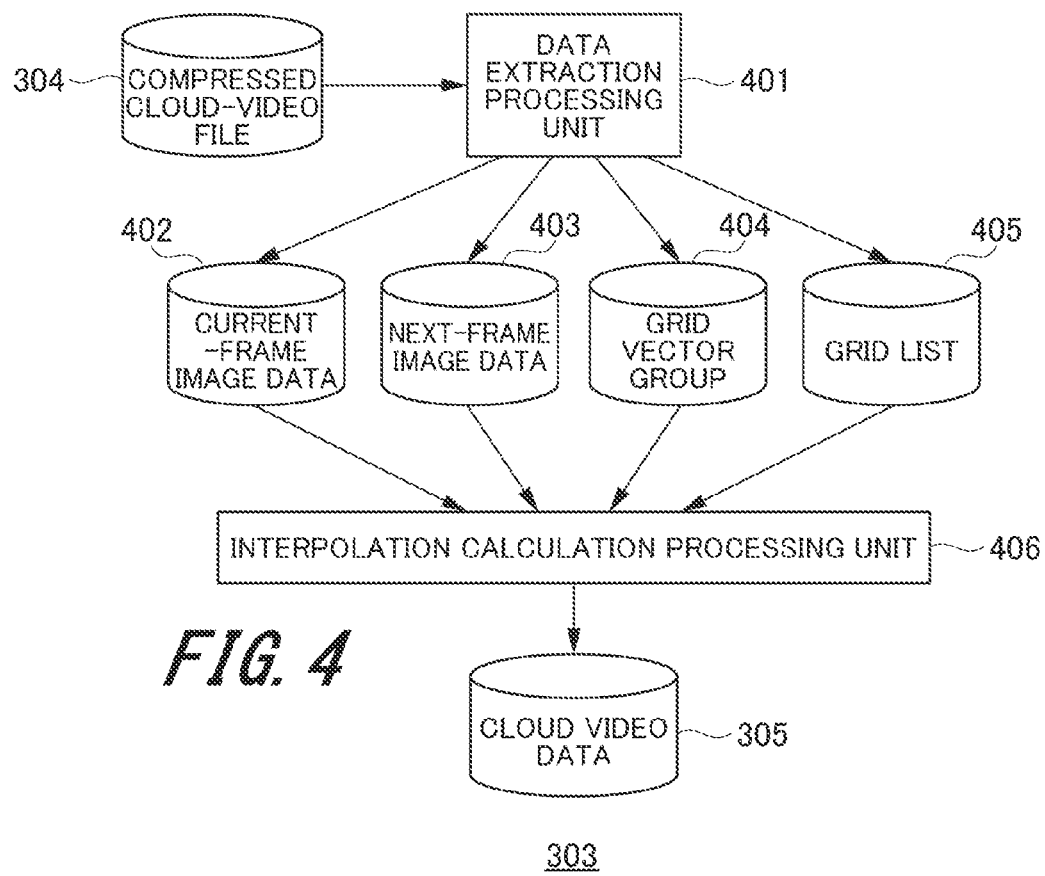
FIG. 4 is a block diagram showing an internal function of a cloud-video playback processing unit.

FIG. 4 is a block diagram showing an internal function of the cloud-video playback processing unit 303.

The compressed cloud-video file 304 is read by a data extraction processing unit 401.

The data extraction processing unit 401 outputs, from the compressed cloud-video file 304, current-frame image data 402, next-frame image data 403, a grid vector group 404, and a grid list 405. Note that the data extraction processing unit 401 excerpts, from the body (payload) of the compressed cloud-video file 304, and outputs the current-frame image data 402, the next-frame image data 403, and the grid vector group 404, and calculates, from the header of the compressed cloud-video file 304, and outputs the grid list 405.

The current-frame image data 402 is image data at a base point in time.

The next-frame image data 403 is image data at a point in time after a predetermined time has elapsed since the base point in time.

The grid vector group 404 is a collection (list or array variable) of grid vectors. The grid vectors are vectors indicating the amounts of movement and the directions of movement of items of grid-cell image data, into which the current-frame image data 402 is subdivided, toward coordinate directions in the screen at the point in time of the next-frame image data 403.

The grid list 405 is a collection (list or array variable) of grid cells. The grid list 405 is calculated from grid information contained in header information of the compressed cloud-video file 304, to be described later, and from the size of frame image data.

Although it is in the middle of the explanation of FIG. 4, the grid list 405 and grid cells will be described below with reference to the drawing.

Figure 5:
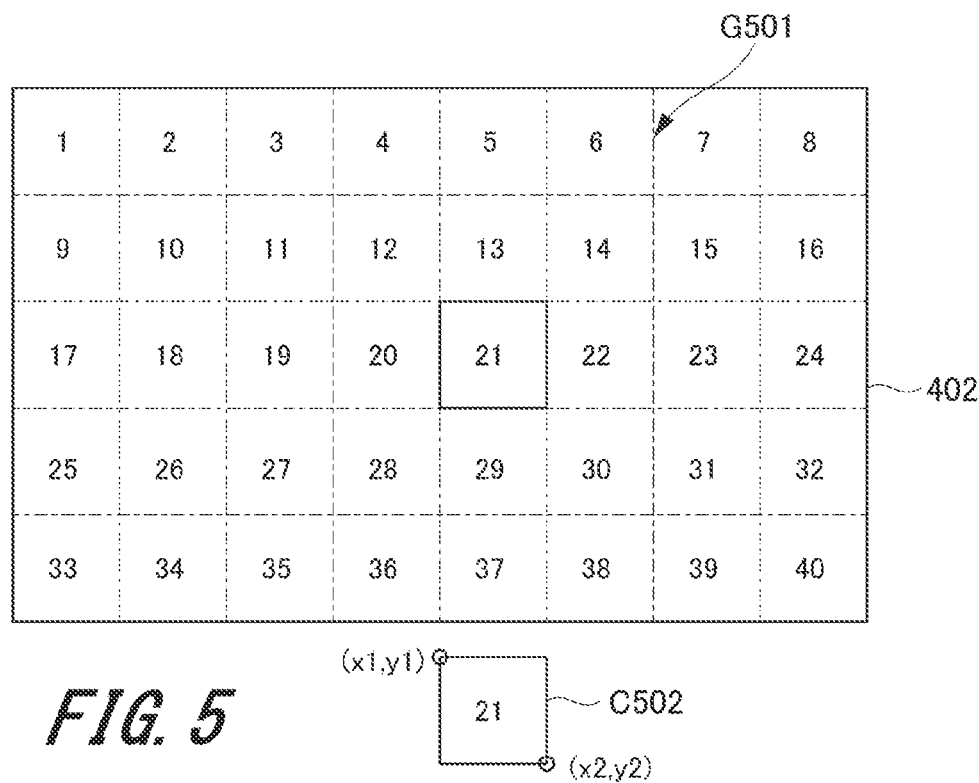
FIG. 5 is a schematic view showing the state of a grid and grid cells applied to current-frame image data.

FIG. 5 is a schematic view showing the state of a grid G501 and grid cells C502 that are applied to the current-frame image data 402.

FIG. 5 shows a state in which the current-frame image data 402 at a certain point in time is displayed on a predetermined display device. The grid G501 (grid) consisting of 5 rows and 8 columns is formed with respect to this still image. In FIG. 5, the grid G501 is expressed with vertical and horizontal broken lines.

Note that the grid G501 consisting of 5 rows and 8 columns shown in FIG. 5 is merely an example for explanation, and the grid G501 consists of more rows and more columns at an actual device.

Each of the grid cells C502 indicates a specific element in the grid list 405. Specifically, a grid-cell number is passed to the grid list 405 as an argument, and the address of the corresponding grid cell C502 is output. In FIG. 5, every single square constituting the grid corresponds to a grid cell C502.

Here, the grid-cell number indicates the element number of a particular grid cell C502 in the grid list 405. Specifically, the grid-cell numbers are given to grid cells C502 in the lateral direction from the top left to the bottom right.

In FIG. 5, grid number 1 is given to the top-left grid cell in the grid. Grid number 2 is given to the right-neighboring grid cell of the grid cell of the grid number 1, grid number 3 is given to the right-neighboring grid cell of the grid cell of the grid number 2, grid number 4 is given to the right-neighboring grid cell of the grid cell of the grid number 3, and grid numbers are given in the same way until grid number 8 is given to the grid cell at the right end. Since the grid cell of grid number 8 is located at the right end in the first row, grid number 9 is given to the grid cell at the left end in the next row. In the same way, grid numbers are given to grid cells from the top left to the bottom right, and grid number 40 is given to the lower rightmost grid cell.

The grid-cell address indicates address information of a particular grid cell in the grid list 405. Here, the address information is indicated by a set of a number on the x-axis and a number on the y-axis of a pixel on a frame image. One grid cell can be identified by address information (x1,y1) of the pixel at the top-left end thereof and address information (x2,y2) of the pixel at the bottom-right end thereof.

Therefore, when the grid-cell number is passed to the grid list 405 as an argument, it is possible to obtain address information (x1,y1) of the pixel at the top-left end and address information (x2,y2) of the pixel at the bottom-right end of the grid cell corresponding to this grid-cell number.

Note that, although the grid list 405 is described as an array variable in the program in this embodiment, it is also possible to implement the grid list 405 as a function in the program.

Returning to FIG. 4, the description of the functional block is continued.

An interpolation calculation processing unit 406 performs frame interpolation calculation for frames between the current-frame image data 402 and the next-frame image data 403 on the basis of the current-frame image data 402, the next-frame image data 403, the grid vector group 404, and the grid list 405, and outputs the cloud video data 305.

Here, before the operation of the interpolation calculation processing unit 406 is described, a format (compressed-video-data structure) of the compressed cloud-video file 304 will be described below with reference to FIG. 6.

Figure 6:
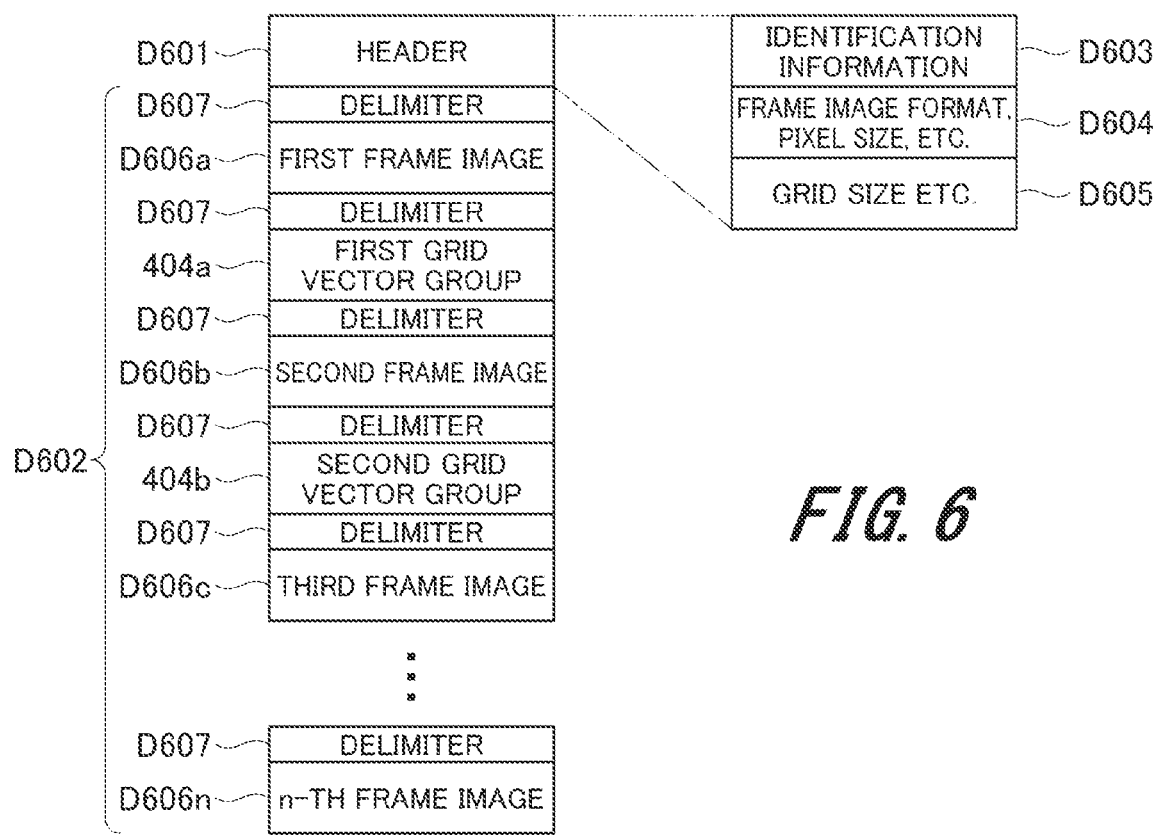
FIG. 6 is a schematic view showing an example format of a compressed cloud-video file.

FIG. 6 is a schematic view showing an example format of the compressed cloud-video file 304.

The compressed cloud-video file 304 consists of a header D601 and a body D602 (payload).

The header D601 stores:
identification information D603 indicating that this file is a compressed cloud-video file 304;
image specification information D604 such as a data format (jpg, png, tiff, etc.) of frame images stored in the body D602 and the pixel size of the frame images stored in the body D602; and
size information D605 (vertical and horizontal pixel sizes) of a grid cell.

Here, the number of elements in the grid vector group 404 and the number of elements in the grid list 405, which are shown in FIG. 4, can be derived by dividing the pixel size of frame image data by the size of a grid cell. Therefore, the data extraction processing unit 401 performs this division to derive the number of elements of vectors and the number of elements of grid cells from the header D601 shown in FIG. 6.

Items of frame image data D606 are image data in which all pixel sizes are the same.

In the case where first frame image data D606a serves as the current-frame image data 402, second frame image data D606b serves as the next-frame image data 403.

In the case where the second frame image data D606b serves as the current-frame image data 402, third frame image data D606c serves as the next-frame image data 403.

The grid vector group 404 is a list listing grid vectors. The grid vectors form elements in the grid vector group 404.

Each of the grid vectors is information on a vector indicating that an image of a certain grid cell on the current-frame image data 402 moves to a predetermined position on the next-frame image data 403, and consists of an x-axis-direction component and a y-axis-direction component on a pixel basis.

In FIG. 6, grid vector groups 404a, 404b, etc., follow items of frame image data D606.

In the body D602, an item of frame image data D606 and a grid vector group 404 are alternately inserted, with a delimiter D607 sandwiched therebetween, as follows:
delimiter D607 (delimiter, separator, or the like)
first frame image data D606a
delimiter D607
first grid vector group 404a
delimiter D607
second frame image data D606b
delimiter D607
second grid vector group 404b, and so on.

Note that, although the compressed cloud-video file 304 and the video data are expressed in a file format in FIG. 6, they can be handled in a stream format by configuring the video data in a stream format by appropriately inserting the header D601 at predetermined time intervals.

Furthermore, it is conceivable to use a method in which the addresses to and the sizes of items of frame image data are written in the header D601, without using the delimiters D607. However, in the case where the delimiters D607 are not used, it is difficult to handle the video data in a stream format.

Returning to FIG. 4, a content-data extraction processing function will be described on the basis of the operation of the data extraction processing unit 401.

The data extraction processing unit 401 outputs the current-frame image data 402, the next-frame image data 403, and the grid vector group 404, which is interposed between the current-frame image data 402 and the next-frame image data 403, to the interpolation calculation processing unit 406.

Note that the grid list 405 is information having a constant value regardless of movement of a frame, and is derived from the header D601 of the compressed cloud-video file 304.

Figure 7:
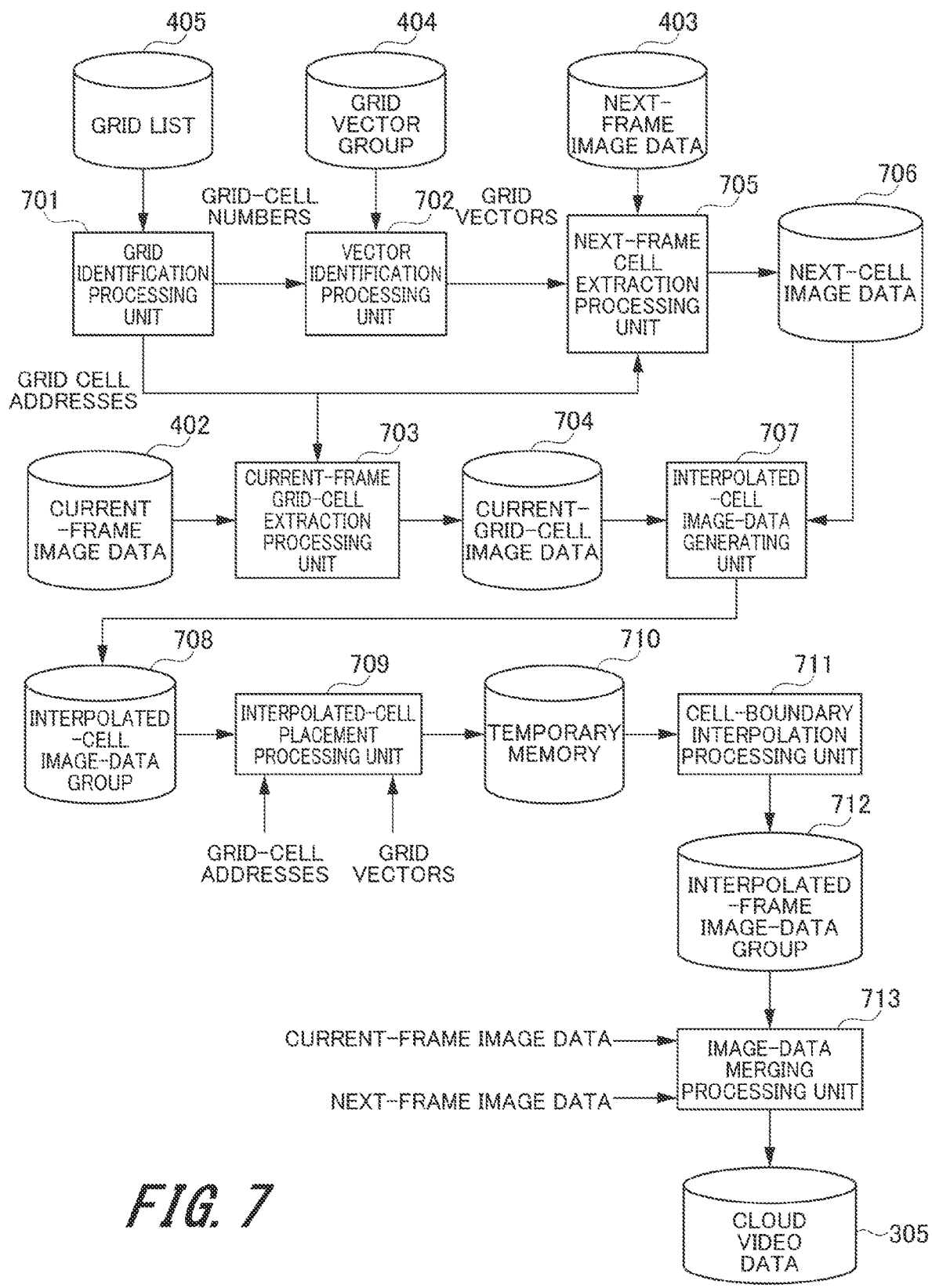
FIG. 7 is a block diagram showing an internal function of an interpolation calculation processing unit.

FIG. 7 is a block diagram showing an internal function (interpolation calculation processing function) of the interpolation calculation processing unit 406.

A grid identification processing unit 701 takes out n-th grid-cell addresses sequentially from the top of the grid list 405.

Grid-cell numbers specified by the grid identification processing unit 701 are input to a vector identification processing unit 702. The vector identification processing unit 702 takes out, from the grid vector group 404, n-th grid vectors corresponding to the grid-cell numbers specified by the grid identification processing unit 701.

On the other hand, the grid-cell addresses output from the grid identification processing unit 701 are input to a current-frame grid-cell extraction processing unit 703. The current-frame grid-cell extraction processing unit 703, which provides a current-frame grid-cell extraction processing function, cuts out a portion specified by each of the grid-cell addresses from the current-frame image data 402, to generate current-grid-cell image data 704. The current-grid-cell image data 704 indicates image data of each of grid cells C502 into which the current-frame image data 402 is subdivided on the basis of the grid G501.

The grid-cell addresses output from the grid identification processing unit 701 and the grid vectors output from the vector identification processing unit 702 are input to a next-frame cell extraction processing unit 705. The next-frame cell extraction processing unit 705, which provides a next-frame cell extraction processing function, cuts out, from the next-frame image data 403, a portion specified by each of the destination grid-cell addresses to which the grid-cell addresses have been moved by the grid vectors, to generate next-cell image data 706.

As described above, the grid identification processing unit 701 realizes a grid identification processing function in a content-video playback program by means of the computer, and the vector identification processing unit 702 realizes a vector identification processing function.

Note that, although the current-grid-cell image data 704 is image data cut out on the basis of the grid G501, the next-cell image data 706 is image data cut out on the basis of the address of a cell to which a grid address is moved by a grid vector. Thus, although the next-cell image data 706 is equal to the current-grid-cell image data 704 in size and shape, since the next-cell image data 706 is not cut out on the basis of the grid G501, a name of "grid" is not used in the next-cell image data 706.

The current-grid-cell image data 704 and the next-cell image data 706 are input to an interpolated-cell image-data generating unit 707.

The interpolated-cell image-data generating unit 707 generates an interpolated-cell image-data group 708 for the number of frames that is set to exist between the current-grid-cell image data 704 and the next-cell image data 706.

For example, if it is assumed that grid-cell image data of a cloud is taken at 20 second intervals, when normal video playback with a frame rate of 30 fps is performed, it is necessary to generate 598 (=30×20−2) items of interpolated frame image data. The two items of image data to be subtracted correspond to the current-grid-cell image data 704 and the next-cell image data 706.

Then, the interpolated-cell image-data generating unit 707 generates these items of interpolated frame image data through interpolation calculation processing. Specifically, the interpolated-cell image-data generating unit 707 performs smoothing of a certain pixel in the current-grid-cell image data 704 and the pixel, at the same address as the certain pixel, in the next-cell image data 706.

For example, if red brightness of the certain pixel in the current-grid-cell image data 704 is 100, and red brightness of the pixel at the same address in the next-cell image data 706 is 200, change from 100 to 200 is divided by 600 items of frame image data. The brightness is increased from 100 by 1 for every 6 frames.

When the brightness of a certain color component of the certain pixel in the current-grid-cell image data 704 is y1, the brightness of the same color component of the pixel at the same address in the next-cell image data 706 is y2, and the number of interpolated frames is m, the brightness y of the pixel in an x-th frame can be derived by the following linear expression.

$$y=[(y2-y1)/m]*x+y1$$

The brightness y of the pixel in an interpolated frame, which is derived through the above interpolation calculation processing, is rounded to an integer value and is output in the interpolated-cell image-data group 708.

Note that, by reducing the number of interpolated frames, it is possible to obtain a fast-forward playback effect. Since the content playback device according to the embodiment of the present invention is used for game content, the content playback device plays back a video at a faster moving speed than the normal cloud moving speed, thereby making it possible to enhance the production effect of an imaginary world provided by the game content.

The interporated-cell image-data generating unit 707 executes the above-described calculation processing for each of the grid-cell numbers, thereby generating interpolated-cell image-data groups 708 for all the grid cells.

An interpolated-cell placement processing unit 709 that provides an interpolated-cell placement processing function reads grid-cell addresses from the grid list 405 and reads grid vectors from the grid vector group 404. Then, the interpolated-cell placement processing unit 709 places the interpolated-cell image-data groups 708 on an interpolated-frame area of a temporary memory 710 formed in the RAM 203.

However, if items of interpolated grid-cell image data are just placed on the interpolated-frame area formed in the temporary memory 710, there are many possibilities of gaps between adjacent items of interpolated grid-cell image data and overlap therebetween. Then, a cell-boundary interpolation processing unit 711 that provides a cell-boundary interpolation processing function executes a processing for obscuring the gaps, such as smoothing or average-value interpolation, at the boundaries between the adjacent items of interpolated grid-cell image data.

Accordingly, an interpolated-frame image-data group 712 is generated.

At an image-data merging processing unit 713, this interpolated-frame image-data group 712 is sandwiched between the current-frame image data 402 and the next-frame image data 403, to complete the cloud video data 305.

Figure 8A:
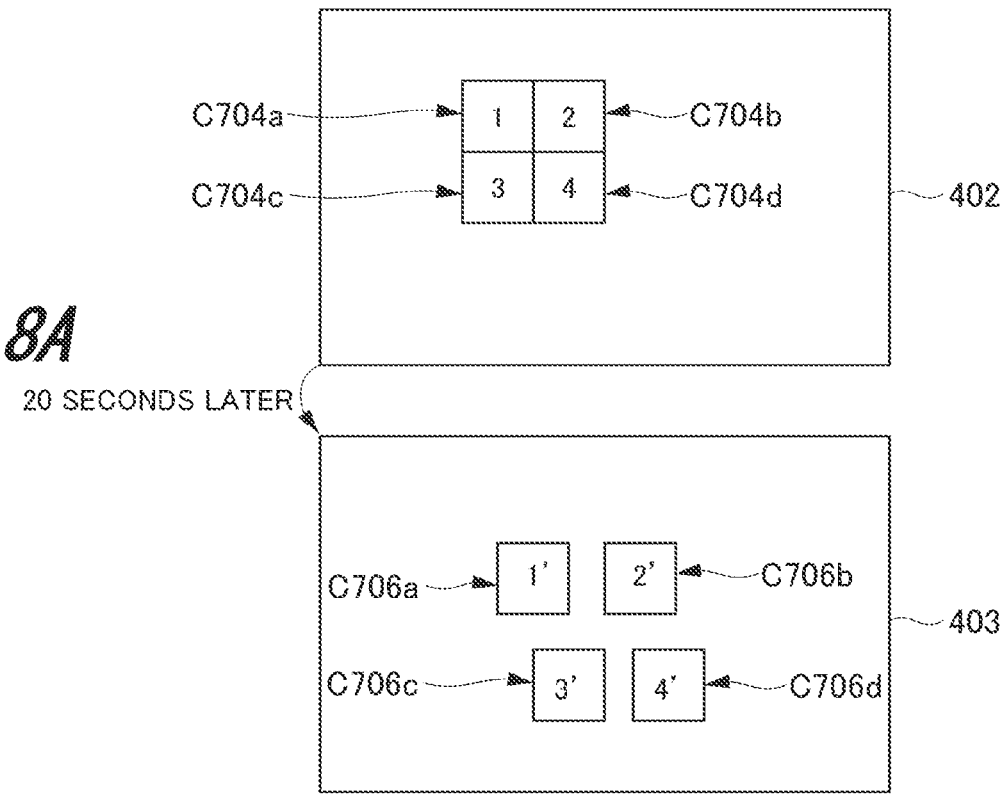
FIGS. 8A-8B include schematic views for explaining grid relationships between current-frame image data and next-frame image data.
Figure 8B:
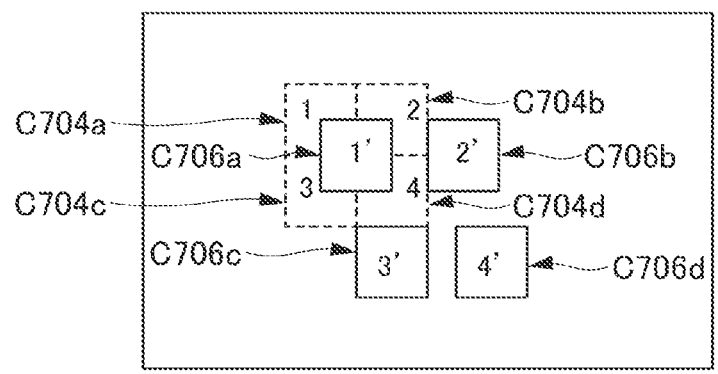

FIGS. 8A and 8B are schematic views for explaining the relationships between items of current-grid-cell image data 704 in the current-frame image data 402 and items of next-cell image data 706 in the next-frame image data 403.

In FIG. 8A, a first grid cell C704a (indicated by "1" in FIG. 8A) that is an item of current-grid-cell image data 704 in the current-frame image data 402 moves to a first cell C706a (indicated by "1'" in FIG. 8A) that is an item of next-cell image data 706.

In the same way, a second grid cell C704b (indicated by "2" in FIG. 8A) moves to a second cell C706b (indicated by "2'" in FIG. 8A), a third grid cell C704c (indicated by "3" in FIG. 8A) moves to a third cell C706c (indicated by "3'" in FIG. 8A), and a fourth grid cell C704d (indicated by "4" in FIG. 8A) moves to a fourth cell C706d (indicated by "4'" in FIG. 8A), respectively.

The grid cells 1, 2, 3, and 4 in the current-frame image data 402 and the cells 1', 2', 3', and 4' in the next-frame image data 403, which are shown in FIG. 8A, are overlaid, to obtain placement relationships shown in FIG. 8B.

The cell 1' is a region that has the same size as the grid cell 1 and that is identified as a region most likely to be the destination of the grid cell 1, by a method such as template matching by using the grid cell 1, from among vicinities of a region in the next frame image, the region corresponding to the grid cell 1, at the time of generation of video data to be described with reference to FIG. 10 etc. Specifically, at the time of generation of video data, a grid vector is identified on the basis of the difference between the grid cell 1 and the cell 1'.

Note that grid-cell image data of the grid cell 1 and cell image data of the cell 1' do not have to be perfectly matched as long as they are similar enough.

Figure 9:
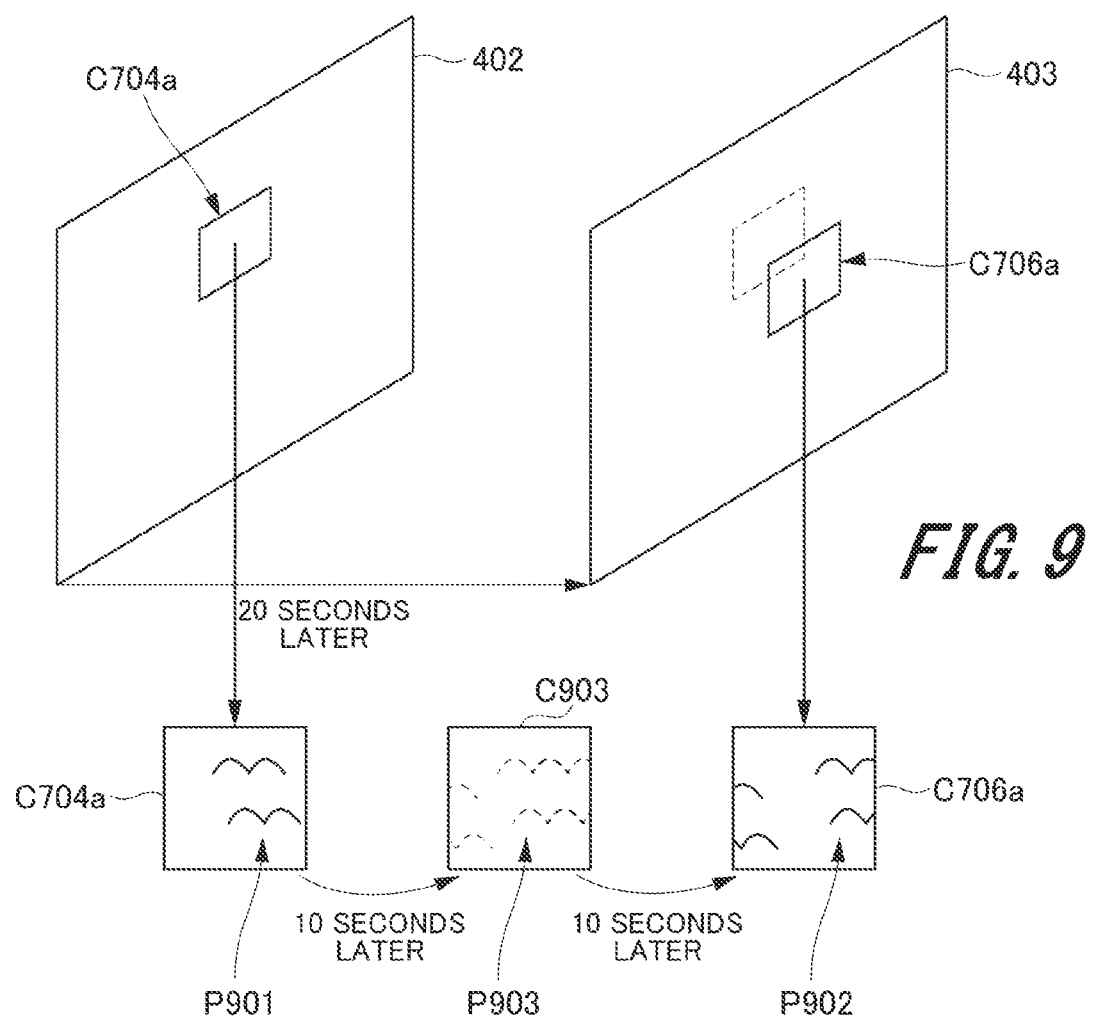
FIG. 9 is a schematic view for explaining frame interpolation.

FIG. 9 is a schematic view for explaining frame interpolation.

FIG. 9 shows a state in which the first grid cell C704a in the current-frame image data 402 has changed to the first cell C706a in the next-frame image data 403 after 20 seconds.

The interpolated-cell image-data generating unit 707, which provides an interpolated-cell image-data generation function, performs interpolation calculation processing for each pixel, during movement from a certain grid cell in the current-frame image data 402 to the certain cell in the next frame image.

FIG. 9 shows a state in which an interpolated cell C903 has been generated between the first grid cell C704a in the current-frame image data 402 and the first cell C706a in the next-frame image data 403, by the interpolated-cell image-data generating unit 707. At this time, a distinctive pattern P901 present in the first grid cell C704a and a distinctive pattern P902 present in the first cell C706a are mixed with each other at the interpolated cell C903, which is generated through interpolation calculation performed by the interpolated-cell image-data generating unit 707, whereby a pattern P903 is formed.

The known technical idea of morphing is applied to the above-described processing at the cloud-video playback processing unit 303, in particular, at the interpolation calculation processing unit 406, in the content playback device

101. Although, in the known morphing, advanced interpolation calculation processing involving deformation of a partial image is performed on two items of image data having clear outlines, if morphing of the existing technique is performed, as it is, for clouds having vague outlines, smooth video data cannot be generated.

The inventors notice that, when a video of clouds is generated, the flow of clouds can be expressed only by movement of a partial image. Since this technique does not imitate the known morphing and does not involve deformation of a partial image, the amount of calculation required to generate video data can be minimized.

The cloud-video playback processing unit 303 in the content playback device 101 according to the embodiment of the present invention can generate video data of aerosols in the atmosphere, such as cloud, fog, haze, steam, and gas, through only simple calculation processing in which items of grid-cell image data are moved by grid vectors, and brightness interpolation calculation processing is performed.

[Compressed-Cloud-Video-File Generation Device 1001]

The new format of the compressed cloud-video file 304 and the content playback device 101, which plays back the compressed cloud-video file 304, have been described above.

A compressed-cloud-video-file generation device 1001 that encodes a number of items of still-image data of clouds taken at predetermined time intervals, to generate the compressed cloud-video file 304 will be described blow with reference to FIGS. 10 to 13.

Figure 10:
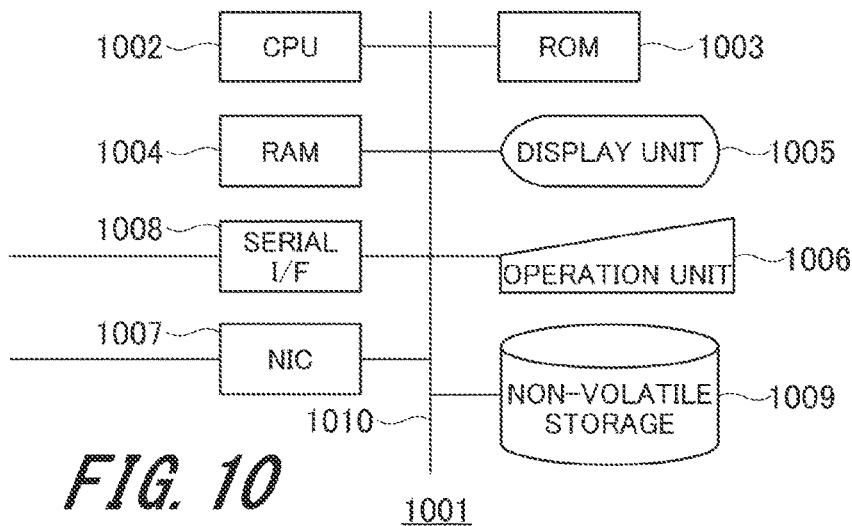
FIG. 10 is a block diagram showing the hardware configuration of a compressed-cloud-video-file generation device.

FIG. 10 is a block diagram showing the hardware configuration of the compressed-cloud-video-file generation device 1001.

The compressed-cloud-video-file generation device 1001, which is a well-known computer such as a general personal computer, includes a CPU 1002, a ROM 1003, a RAM 1004, a display unit 1005, an operation unit 1006, a NIC 1007 (network interface card), a serial interface 1008 such as a USB, and a non-volatile storage 1009 that are connected to a bus 1010.

A program causing a computer to operate as the compressed-cloud-video-file generation device 1001 is stored in the non-volatile storage 1009.

Still-image files of clouds and other files are read via the serial interface and/or a network.

Figure 11:
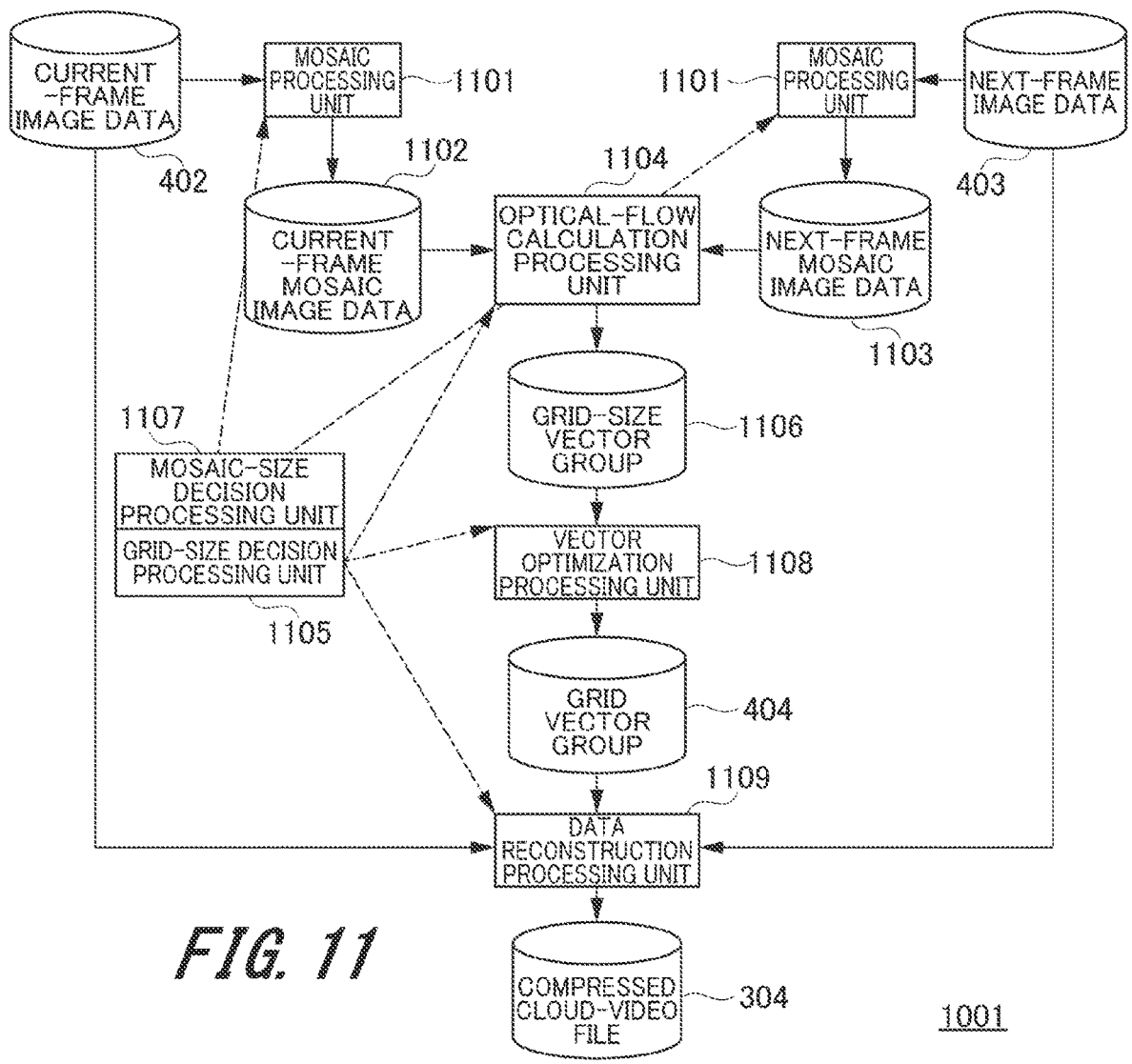
FIG. 11 is a block diagram showing software functions of the compressed-cloud-video-file generation device.

FIG. 11 is a block diagram showing software functions of the compressed-cloud-video-file generation device 1001.

The current-frame image data 402 and the next-frame image data 403 are respectively read by mosaic processing units 1101.

The mosaic processing units 1101 respectively generate current-frame mosaic image data 1102 and next-frame mosaic image data 1103 each of which the solution has been reduced through well-known average-value calculation processing.

The current-frame mosaic image data 1102 and the next-frame mosaic image data 1103 are read by an optical-flow calculation processing unit 1104.

The optical-flow calculation processing unit 1104 provides an optical-flow calculation processing function, and a grid-size decision processing unit 1105 provides a grid-size decision processing function.

The optical-flow calculation processing unit 1104 identifies, from the next-frame mosaic image data 1103 and by a technique such as template matching, a region most likely to be the destination of partial image data that is excerpted with a grid size specified by the grid-size decision processing unit 1105. Then, a grid-size vector that is a movement vector is calculated.

The optical-flow calculation processing unit 1104 executes this calculation processing with respect to all items of partial image data of the grid to generate a grid-size vector group 1106.

In cooperation with the grid-size decision processing unit 1105, a mosaic-size decision processing unit 1107 decides a mosaic size in accordance with the grid size, with respect to the mosaic processing units 1101 and the optical-flow calculation processing unit 1104 and controls the optical-flow calculation processing unit 1104.

Mosaic processing is performed on items of image data, whereby determination of similarity between the items of image data can be executed on a mosaic-size basis. Thus, through execution of the mosaic processing, it is possible to reduce the amount of calculation at the optical-flow calculation processing unit 1104. Furthermore, it is also possible to obtain an effect of reducing errors in vectors obtained through calculation. The mosaic-processing effect obtained by this reduction in vector errors is larger than that obtained by the other.

First, the mosaic-size decision processing unit 1107 specifies a large mosaic size to the mosaic processing units 1101. The mosaic processing units 1101 perform mosaic processing with the size specified by the mosaic-size decision processing unit 1107, to generate the current-frame mosaic image data 1102 and the next-frame mosaic image data 1103 each having the large mosaic size. Specifically, the mosaic processing units 1101 each realize a mosaic processing function in the content-video playback program by means of the computer.

Then, the grid-size decision processing unit 1105 specifies, to the optical-flow calculation processing unit 1104, a grid of the grid size corresponding to the mosaic size specified to the mosaic processing units 1101 by the mosaic-size decision processing unit 1107. The optical-flow calculation processing unit 1104 performs optical-flow calculation processing with the grid size specified by the grid-size decision processing unit 1105, to generate a large-grid-size vector group 1106.

Specifically, the grid-size decision processing unit 1105 realizes a mosaic-size decision processing function in the content-video playback program by means of the computer.

Next, the mosaic-size decision processing unit 1107 divides the above-mentioned mosaic size into two equal sizes in both vertical and horizontal directions, i.e., into four equal sizes. Then, the mosaic-size decision processing unit 1107 specifies thus-obtained subdivided mosaic size to the mosaic processing units 1101. In the same way as described above, the mosaic processing units 1101 perform mosaic processing with the mosaic size specified by the mosaic-size decision processing unit 1107, to generate the current-frame mosaic image data 1102 and the next-frame mosaic image data 1103 each having a smaller mosaic size than that of the image data generated above.

Then, the grid-size decision processing unit 1105 divides the above-mentioned grid size into two equal sizes in both the vertical and horizontal directions, i.e., into four equal sizes. Furthermore, the grid-size decision processing unit 1105 specifies a grid of the thus-obtained subdivided grid size to the optical-flow calculation processing unit 1104. The optical-flow calculation processing unit 1104 performs optical-flow calculation processing with the grid size specified by the grid-size decision processing unit 1105, to generate a grid-size vector group 1106 having a smaller grid size than that of the grid-size vector group 1106 generated earlier.

Thereafter, in the same way, while respectively reducing the mosaic size and the grid size in a step-by-step manner, the mosaic-size decision processing unit 1107 and the grid-size decision processing unit 1105 make the mosaic processing units 1101 and the optical-flow calculation processing unit 1104 operate and generate the grid-size vector group 1106 in accordance with the grid size.

The grid-size decision processing unit 1105 manages the number of rounds of the series of repetitive calculation processing.

The grid-size vector group 1106 that is generated through the above-described repetitive calculation processing, which is performed by the mosaic processing units 1101 and the optical-flow calculation processing unit 1104, is input to a vector optimization processing unit 1108.

The vector optimization processing unit 1108, which provides a vector optimization processing function, detects an error in grid-size vectors included in the grid-size vector group 1106 and replaces an erroneous vector with a higher-rank grid-size vector. Then, eventually, the vector optimization processing unit 1108 applies weighted addition processing to vectors of a plurality of grid sizes, to calculate the grid vector group 404 having a grid size to be used for the compressed cloud-video file 304.

Note that, although simple replacement with a higher-rank vector is illustrated in this embodiment, the vector optimization processing is not necessarily limited to replacement with a higher-rank vector. It is also possible to adopt correction using weighted addition or the like, the correction also using higher-rank vectors.

Furthermore, a data reconstruction processing unit 1109 that provides a data reconstruction processing function reads the grid vector group 404, the current-frame image data 402, and the next-frame image data 403, to generate the compressed cloud-video file 304.

Specifically, the data reconstruction processing unit 1109 sandwiches the grid vector group 404 between the current-frame image data 402 and the next-frame image data 403, with delimiters D607 interposed therebetween, and adds the header D601 thereto, thereby generating the compressed cloud-video file 304.

Figure 12:
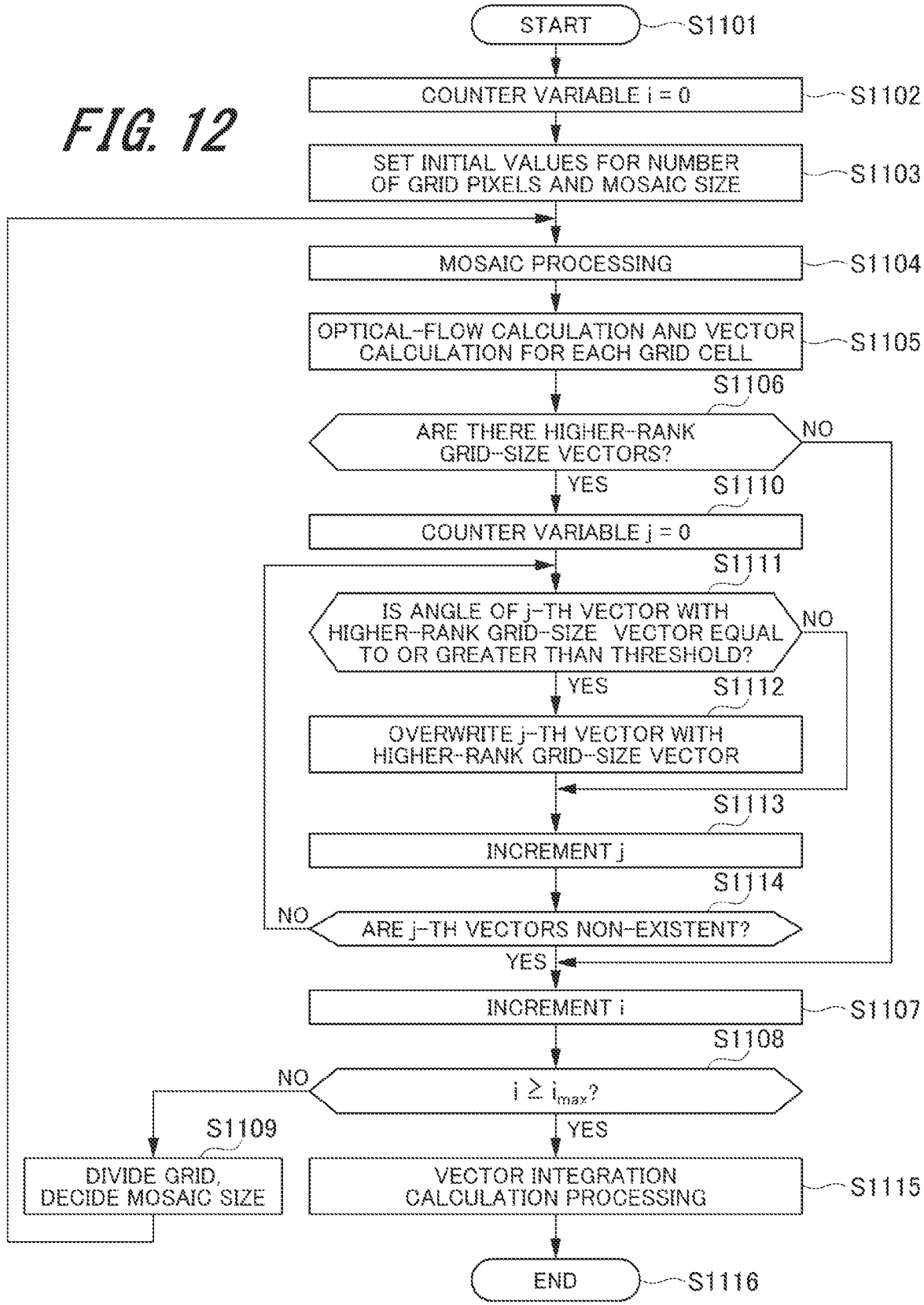
FIG. 12 is a flowchart showing the flow of an operation of the compressed-cloud-video-file generation device.

FIG. 12 is a flowchart showing the flow of an operation of the compressed-cloud-video-file generation device 1001.

When processing is started (S1101), the grid-size decision processing unit 1105 initializes a counter variable i to 0 (S1102). This counter variable i is a number corresponding to the rank of the grid size.

Next, the grid-size decision processing unit 1105 sets the initial value of the number of pixels in the grid. Then, the mosaic-size decision processing unit 1107 sets a mosaic size to be used in mosaic processing (S1103).

Steps from now on form loop processing.

First, the mosaic processing units 1101 apply mosaic processing to the current-frame image data 402 and the next-frame image data 403 in accordance with the mosaic size decided by the mosaic-size decision processing unit 1107, and output the current-frame mosaic image data 1102 and the next-frame mosaic image data 1103 (S1104).

Next, the optical-flow calculation processing unit 1104 applies optical-flow calculation processing to the current-frame mosaic image data 1102 and the next-frame mosaic image data 1103 on the basis of the grid size decided by the grid-size decision processing unit 1105, to calculate grid-size vectors (S1105).

Next, the grid-size decision processing unit 1105 confirms whether there are higher-rank grid-size vectors at this point in time (S1106). Since there are no higher-rank grid-size vectors at the time of the first processing (NO in S1106), the grid-size decision processing unit 1105 increments the counter variable i by 1 (S1107). Then, the grid-size decision processing unit 1105 confirms whether the counter variable i has reached a maximum number imax (S1108). Since the counter variable i has just been increased to 1 at the time of the first processing (NO in S1108), the grid-size decision processing unit 1105 generates a lower-rank grid by dividing the grid size into four and decides a smaller mosaic size than that used in the most recent processing (S1109). Then, the processing is repeated from Step S1104.

If there are higher-rank grid-size vectors in Step S1106 (YES in S1106), the grid-size decision processing unit 1105 instructs the vector optimization processing unit 1108 to execute processing.

First, the vector optimization processing unit 1108 initializes a counter variable j to 0 (S1110). This counter variable j is a number assigned on the basis of the location of the grid. Next, the vector optimization processing unit 1108 confirms whether the angle of each j-th grid-size vector with the corresponding grid-size vector located in the higher-rank is equal to or greater than a threshold (S1111).

In Step S1111, in the case where the angle thereof with the grid-size vector located in the higher-rank is equal to or greater than the threshold (YES in S1111), it is indicated that this grid-size vector calculated in Step S1105 is directed in a direction significantly different from the higher-rank grid-size vector. Then, this grid-size vector is treated as an invalid vector that is failed to be detected, and is overwritten with the higher-rank grid-size vector (S1112).

In Step S1111, in the case where the angle thereof with the grid-size vector located in the higher-rank is less than the threshold (NO in S1111), nothing is performed.

After Step S1112 or in the case of NO in Step S1111, the vector optimization processing unit 1108 increments the counter variable j by 1 (S1113).

Next, the vector optimization processing unit 1108 confirms whether j-th grid-size vectors are non-existent (S1114).

In Step S1114, if j-th grid-size vectors are not non-existent (NO in S1114), the vector optimization processing unit 1108 repeats the processing again from Step S1111.

In Step S1114, if j-th grid-size vectors are non-existent (YES in S1114), the vector optimization processing unit 1108 terminates the processing once and gives the initiative of the processing over to the grid-size decision processing unit 1105. Upon reception of this, the grid-size decision processing unit 1105 repeats the processing from Step S1107.

Furthermore, in Step S1108, when the counter variable i has reached the maximum number imax (YES in S1108), the grid-size decision processing unit 1105 instructs the data reconstruction processing unit 1109 to execute processing.

The data reconstruction processing unit 1109 sandwiches the grid vector group 404 between the current-frame image data 402 and the next-frame image data 403, with the delimiters D607 interposed therebetween, and adds the header D601 thereto, thereby generating the compressed cloud-video file 304 (51115). In this way, the series of processing is terminated (S1116).

FIG. 13 are schematic views for explaining the relationships between higher-rank grid vectors and lower-rank grid vectors.

Figure 13A:
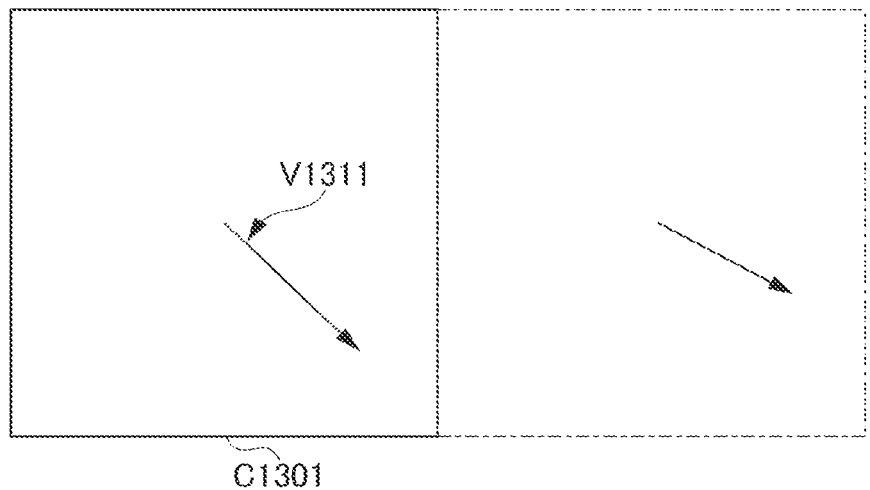
FIGS. 13A, 13B, and 13C include schematic views for explaining the relationships between higher-rank grid vectors and lower-rank grid vectors.

FIG. 13A shows two grid cells in the highest-rank grid.

Figure 13B:
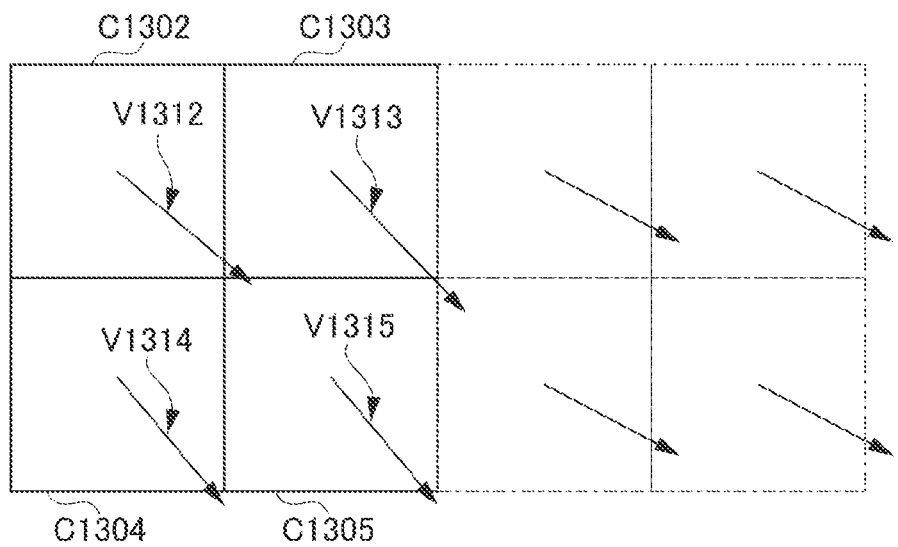

FIG. 13B shows eight grid cells in the second-highest-rank grid that belong to the two grid cells shown in FIG. 13A.

Figure 13C:
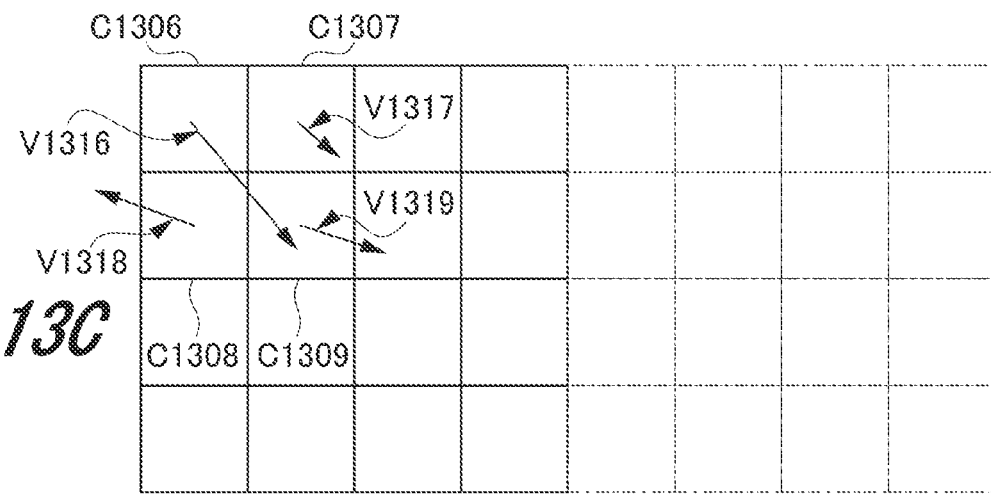

FIG. 13C shows 32 grid cells in the third-highest-rank grid that belong to the two grid cells shown in FIG. 13A and the eight grid cells shown in FIG. 13B.

A highest-rank grid-size vector V1311 is calculated for and is linked with a highest-rank grid cell C1301 shown in FIG. 13A by the optical-flow calculation processing unit 1104. The highest-rank grid cell C1301 is equally divided into two equal cells in both vertical and horizontal directions, i.e., into four equal cells in total, thus obtaining second-highest-rank grid cells C1302, C1303, C1304, and C1305 shown in FIG. 13B. These grid cells C1302, C1303, C1304, and C1305 are a lower rank of the highest-rank grid cell C1301.

The grid cell C1302 is equally divided into two equal cells in both the vertical and horizontal directions, i.e., into four equal cells in total, thus obtaining third-highest-rank grid cells C1306, C1307, C1308, and C1309 shown in FIG. 13C. These grid cells C1306, C1307, C1308, and C1309 are a lower rank of the grid cell C1302.

Specifically, it is found that the highest-rank grid cell C1301, the grid cells C1302, C1303, C1304, and C1305, and the grid cells C1306, C1307, C1308, and C1309 have hierarchical-structure relationships when they are seen in their higher and lower relationships between the grid cells.

In FIG. 13C, grid-size vectors V1316, V1317, and V1319 are directed in directions roughly similar to a higher-rank grid-size vector V1312. However, only a grid-size vector V1318 is directed in a direction significantly different from the higher-rank grid-size vector V1312. A grid-size vector of which the direction is completely different from that of a higher-rank grid-size vector in this way is overwritten with the higher-rank grid-size vector. In the case shown in FIG. 13C, the grid-size vector V1318 is overwritten with the grid-size vector V1312 in Step S1112 shown in FIG. 12.

The angle between vectors is calculated from an inner product.

Exceptionally, in the case where the value of the inner product is 0 or less, i.e., in the case where the angle between vectors is 90° or greater, the value of the inner product can be directly used for evaluation.

The above-described embodiment of the present invention can be modified as follows.

(1) In the above-described embodiment, although a grid applied to frame image data is defined to be square or rectangular, the shape of the grid is not necessarily limited to a square shape or a rectangular shape. For example, for virtual-hemisphere image data acquired in all directions, like a planetarium, it is also possible to adopt a grid formed in a radial shape using something like meridians and parallels on the globe, in addition to a grid formed in a polygon, such as an equilateral triangle, a square, and a hexagon.

In such a case where a grid that does not correspond to an even rectangle is adopted, it is necessary to record, in the header D601, coordinate information about intersections in the grid and grid-cell numbers.

(2) The optical-flow calculation processing unit 1104 calculates grid-size vectors that are movement vectors, for items of partial image data excerpted from the current-frame mosaic image data 1102, by referring to the next-frame mosaic image data 1103. That is, calculation processing for calculating movement vectors in the chronologically forward direction is performed.

As a technique for making those grid-size vectors calculated by the optical-flow calculation processing unit 1104 more accurate, it is conceivable that movement vectors in the chronologically reverse direction are also calculated, and average values etc. of the movement vectors in both directions are calculated and are used as final grid-size vectors.

That is, movement vectors in the chronologically reverse direction are calculated, for items of partial image data excerpted from the next-frame mosaic image data 1103, by referring to the current-frame mosaic image data 1102. Then, average values of the movement vectors in the reverse direction and the movement vectors in the forward direction are calculated and are used as grid-size vectors.

(3) Furthermore, when the next-frame mosaic image data 1103 is referred to for partial image data excerpted from the current-frame mosaic image data 1102, it is also possible to detect scaling of the partial image data, by developing calculation processing for template matching at the optical-flow calculation processing unit 1104.

In this case, when a grid-cell number is substituted as an argument, the grid vector group 404, which serves as an array variable, outputs a z-component of the grid vector indicating the magnification of the grid-cell image, in addition to an x-component of the grid vector and a y-component of the grid vector. Then, the vector identification processing unit 702 outputs the grid vector including the grid-cell image magnification, the current-frame grid-cell extraction processing unit 703 outputs the current-grid-cell image data 704 according to the grid vector including the grid-cell image magnification, and the next-frame cell extraction processing unit 705 outputs the next-cell image data 706 according to the grid vector including the grid-cell image magnification.

The embodiment of the present invention discloses the content playback device 101, a content-video playback program for realizing the same, the compressed-cloud-video-file generation device 1001, a compressed-cloud-video-file generation program for realizing the same, and the format of the compressed cloud-video file 304.

The data amount of the compressed cloud-video file 304, which is configured by items of still-image data at intervals of several seconds to several tens of seconds and the grid vector group 404 indicating the directions of movement and the distances of movement of grid-cell image data groups between the items of still-image data, can be overwhelmingly reduced compared with video data having a conventional video data format.

The cloud-video playback processing unit 303, which playbacks the above-described compressed cloud-video file 304, can playback video data of aerosols in the atmosphere, such as cloud, fog, haze, steam, and gas, with high reproducibility, through only simple calculation processing in which items of grid-cell image data are moved by grid vectors, and brightness interpolation calculation processing is performed.

When generating grid vectors, the compressed-cloud-video-file generation device 1001, which generates the above-described compressed cloud-video file 304, performs optical-flow calculation processing while changing the grid from a grid having large grid cells to a grid having small grid cells. At this time, a lower-rank grid vector of which the angle is significantly different from the angle of a higher-rank grid vector is corrected with the higher-rank grid vector, whereby corruption in the compressed cloud-video file 304 can be infrequent.

Although playback of the compressed cloud-video file has mainly been described in the embodiment of the present invention, the compressed cloud-video file is just one embodiment, and the content-video playback program of the present invention is not limited to a video playback program for a compressed cloud-video file.

The content-video playback program of the present invention encompasses wide ranges of modifications and applications for playback of compressed video files other than a compressed cloud-video file, without departing from the gist of the present invention cited in claims.

REFERENCE SIGNS LIST 101 content playback device, 102 display unit, 201 CPU, 202 ROM, 203 RAM, 204 display unit, 205 operation unit, 206 wide-area wireless communication unit, 207 wireless LAN interface, 208 non-volatile storage, 209 bus, 301 main-game-content generation processing unit, 302 game data group, 303 cloud-video playback processing unit, 304 compressed cloud-video file, 305 cloud video data, 306 image composition processing unit, 401 data extraction processing unit, 402 current-frame image data, 403 next-frame image data, 404 grid vector group, 405 grid list, 406 interpolation calculation processing unit, 701 grid identification processing unit, 702 vector identification processing unit, 703 current-frame grid-cell extraction processing unit, 704 current-grid-cell image data, 705 next-frame cell extraction processing unit, 706 next-cell image data, 707 interpolated-cell image-data generating unit, 708 interpolated-cell image-data group, 709 interpolated-cell placement processing unit, 710 temporary memory, 711 cell-boundary interpolation processing unit, 712 interpolated-frame image-data group, 713 image-data merging processing unit, 1001 compressed-cloud-video-file generation device, 1002 CPU, 1003 ROM, 1004 RAM, 1005 display unit, 1006 operation unit, 1007 NIC, 1008 serial interface, 1009 non-volatile storage, 1010 bus, 1101 mosaic processing unit, 1102 current-frame mosaic image data, 1103 next-frame mosaic image data, 1104 optical-flow calculation processing unit, 1105 grid-size decision processing unit, 1106 grid-size vector group, 1107 mosaic-size decision processing unit, 1108 vector optimization processing unit, 1109 data reconstruction processing unit.

The invention claimed is:

1. A non-transitory computer readable medium comprising a content-video playback program causing a computer serving as a content-video playback device comprising a video playback processing unit that extracts a compressed video from a compressed video file to output video data, a main-game-content generation processing unit that reads various kinds of game data from a game data group to generate various videos through an operation using an operation unit, and an image composition processing unit that composes video data generated at the main-game-content generation processing unit and the video data generated at the video playback processing unit, to output the resultant to a display unit, wherein the content-video playback program is configured to perform a method comprising:

excerpting, from the compressed video file, and extracting, by means of a data extraction processing unit, current-frame image data that is image data at a base point in time, next-frame image data that is image data at a point in time after a predetermined time has elapsed from the base point in time, and a grid vector group that is a collection of grid lists listing grid vectors indicating the amounts of movement and the directions of movement of items of grid-cell image data into which the current-frame image data is subdivided, toward coordinate directions in a screen at the point in time of the next-frame image data; and performing, by means of an interpolation calculation processing unit, frame interpolation calculation for frames between the current-frame image data and the next-frame image data on the basis of the current-frame image data, the next-frame image data, the grid vector group, and the grid lists and outputting video data.

2. The non-transitory computer readable medium according to claim 1, wherein the method further comprises:

taking out a grid-cell address sequentially from the top of the grid lists by means of a grid identification processing unit;

taking out a grid vector having a grid-cell number specified by the grid identification processing unit, from the grid vector group by means of a vector identification processing unit;

extracting, from the current-frame image data, current-grid-cell image data generated by cutting out a portion specified by the grid-cell address, by means of a current-frame grid-cell extraction processing unit;

extracting, from the next-frame image data, next-cell image data generated by moving the grid-cell address by the corresponding grid vector and then by cutting out a portion specified by the destination grid-cell address, by means of a next-frame cell extraction processing unit;

generating interpolated-cell image-data groups for the number of frames set to be present between the current-grid-cell image data and the next-cell image data, by means of an interpolated-cell image-data generating unit;

placing the interpolated-cell image-data groups generated at the interpolated-cell image-data generating unit, on a temporary memory by means of an interpolated-cell placement processing unit; and applying, by means of a cell-boundary interpolation processing unit, processing for obscuring gaps through smoothing or average-value interpolation, at boundaries between items of interpolated cell image data, in the interpolated-cell image-data groups for the number of frames, placed on interpolated-frame images by the interpolated-cell placement processing unit.

3. A content-video playback device comprising a video playback processing unit that extracts a compressed video from a compressed video file to output video data, a main-game-content generation processing unit that reads various kinds of game data from a game data group to generate various videos through an operation using an operation unit, and an image composition processing unit that composes video data generated at the main-game-content generation processing unit and the video data generated at the video playback processing unit, to output the resultant to a display unit, the video playback processing unit comprising:

a data extraction processing unit that excerpts, from the compressed video file, and outputs current-frame image data that is image data at a base point in time, next-frame image data that is image data at a point in time after a predetermined time has elapsed from the base point in time, and a grid vector group that is a collection of grid lists listing grid vectors indicating the amounts of movement and the directions of movement of items of grid-cell image data into which the current-frame image data is subdivided, toward coordinate directions in a screen at the point in time of the next-frame image data; and an interpolation calculation processing unit that performs frame interpolation calculation for frames between the current-frame image data and the next-frame image data on the basis of the current-frame image data, the next-frame image data, the grid vector group, and the grid lists and that outputs video data.

4. The content-video playback device according to claim 3, wherein the interpolation calculation processing unit comprises:

a grid identification processing unit that takes out a grid-cell address sequentially from the top of the grid lists;

a vector identification processing unit that takes out a grid vector having a grid-cell number specified by the grid identification processing unit, from the grid vector group;

a current-frame grid-cell extraction processing unit that extracts, from the current-frame image data, current-grid-cell image data generated by cutting out a portion specified by the grid-cell address;

a next-frame cell extraction processing unit that extracts, from the next-frame image data, next-cell image data generated by moving the grid-cell address by the corresponding grid vector and then by cutting out a portion specified by the destination grid-cell address;

an interpolated-cell image-data generating unit that generates interpolated-cell image-data groups for the number of frames set to be present between the current-grid-cell image data and the next-cell image data;

an interpolated-cell placement processing unit that places the interpolated-cell image-data groups generated at the interpolated-cell image-data generating unit, on a temporary memory; and a cell-boundary interpolation processing unit that applies processing for obscuring gaps through smoothing or average-value interpolation, at boundaries between items of interpolated cell image data, in the interpolated-cell image-data groups for the number of frames, placed on interpolated-frame images by the interpolated-cell placement processing unit.

5. A content-video playback method using a content-video playback device comprising a video playback processing unit that extracts a compressed video from a compressed video file to output video data, a main-game-content generation processing unit that reads various kinds of game data from a game data group to generate various videos through an operation using an operation unit, and an image composition processing unit that composes video data generated at the main-game-content generation processing unit and the video data generated at the video playback processing unit and that outputs the resultant to a display unit, the method comprising:

a data extraction processing step of excerpting, from the compressed video file, and outputting current-frame image data that is image data at a base point in time, next-frame image data that is image data at a point in time after a predetermined time has elapsed from the base point in time, and a grid vector group that is a collection of grid lists listing grid vectors indicating the amounts of movement and the directions of movement of items of grid-cell image data into which the current-frame image data is subdivided, toward coordinate directions in a screen at the point in time of the next-frame image data; and an interpolation calculation processing step of performing frame interpolation calculation for frames between the current-frame image data and the next-frame image data on the basis of the current-frame image data, the next-frame image data, the grid vector group, and the grid lists and outputting video data.

6. The content-video playback method according to claim 5, further comprising:

a grid identification processing step of taking out a grid-cell address sequentially from the top of the grid lists by means of a grid identification processing unit;

a vector identification processing step of taking out a grid vector having a grid-cell number specified by the grid identification processing unit, from the grid vector group;

a current-frame grid-cell extraction processing step of extracting, from the current-frame image data, current-grid-cell image data generated by cutting out a portion specified by the grid-cell address;

a next-frame cell extraction processing step of extracting, from the next-frame image data, next-cell image data generated by moving the grid-cell address by the corresponding grid vector and then by cutting out a portion specified by the destination grid-cell address;

an interpolated-cell image-data generating step of generating interpolated-cell image-data groups for the number of frames set to be present between the current-grid-cell image data and the next-cell image data, by means of an interpolated-cell image-data generating unit;

an interpolated-cell placement processing step of placing the interpolated-cell image-data groups generated at the interpolated-cell image-data generating unit, on a temporary memory by means of an interpolated-cell placement processing unit; and a cell-boundary interpolation processing step of applying processing for obscuring gaps through smoothing or average-value interpolation, at boundaries between items of interpolated cell image data, in the interpolated-cell image-data groups for the number of frames, placed on interpolated-frame images by the interpolated-cell placement processing unit.

7. A non-transitory computer readable medium comprising a content-video-data generation program causing a computer to perform a method comprising:

generating current-frame mosaic image data and next-frame mosaic image data, by means of a mosaic processing unit, from current-frame image data that is image data at a base point in time and next-frame image data that is image data at a point in time after a predetermined time has elapsed from the base point in time, the current-frame image data and the next-frame image data being obtained by being excerpted from a compressed video file;

subdividing a mosaic size of the frame mosaic image data and specifying a mosaic size obtained after the subdivision to the mosaic processing unit, by means of a mosaic-size decision processing unit;

subdividing a grid size of the frame mosaic image data, and specifying a grid of a grid size obtained after the subdivision to an optical-flow calculation processing unit, by means of the grid-size decision processing unit;

performing, by means of the optical-flow calculation processing unit, optical-flow calculation processing with the grid size specified by the grid-size decision processing unit, and generating a grid-size vector group in which the grid size is finer than that in a grid-size vector group generated earlier;

detecting an error of a grid-size vector included in the grid-size vector group, replacing an erroneous vector with a higher-rank grid-size vector, applying weighted addition processing to vectors having a plurality of grid sizes, and calculating a grid vector group having a grid size to be used for a compressed video file by means of a vector optimization processing unit; and reading the grid vector group, the current-frame image data, and the next-frame image data and generating the compressed video file by means of a data reconstruction processing unit.

8. A content-video-data generation device comprising:

a mosaic processing unit that generates current-frame mosaic image data and next-frame mosaic image data from current-frame image data that is image data at a base point in time and next-frame image data that is image data at a point in time after a predetermined time has elapsed from the base point in time, the current-frame image data and the next-frame image data being obtained by being excerpted from a compressed video file;

a mosaic-size decision processing unit that subdivides a mosaic size of the frame mosaic image data and that specifies a mosaic size obtained after the subdivision to the mosaic processing unit;

a grid-size decision processing unit that subdivides a grid size of the frame mosaic image data and that specifies a grid of a grid size obtained after the subdivision to an optical-flow calculation processing unit;

the optical-flow calculation processing unit, which performs optical-flow calculation processing with the grid size specified by the grid-size decision processing unit and which generates a grid-size vector group in which the grid size is finer than that in a grid-size vector group generated earlier;

a vector optimization processing unit that detects an error of a grid-size vector included in the grid-size vector group, that replaces an erroneous vector with a higher-rank grid-size vector, that applies weighted addition processing to vectors having a plurality of grid sizes, and that calculates a grid vector group having a grid size to be used for a compressed video file; and a data reconstruction processing unit that reads the grid vector group, the current-frame image data, and the next-frame image data and that generates the compressed video file.

* * * * *